Figures 3, 4:
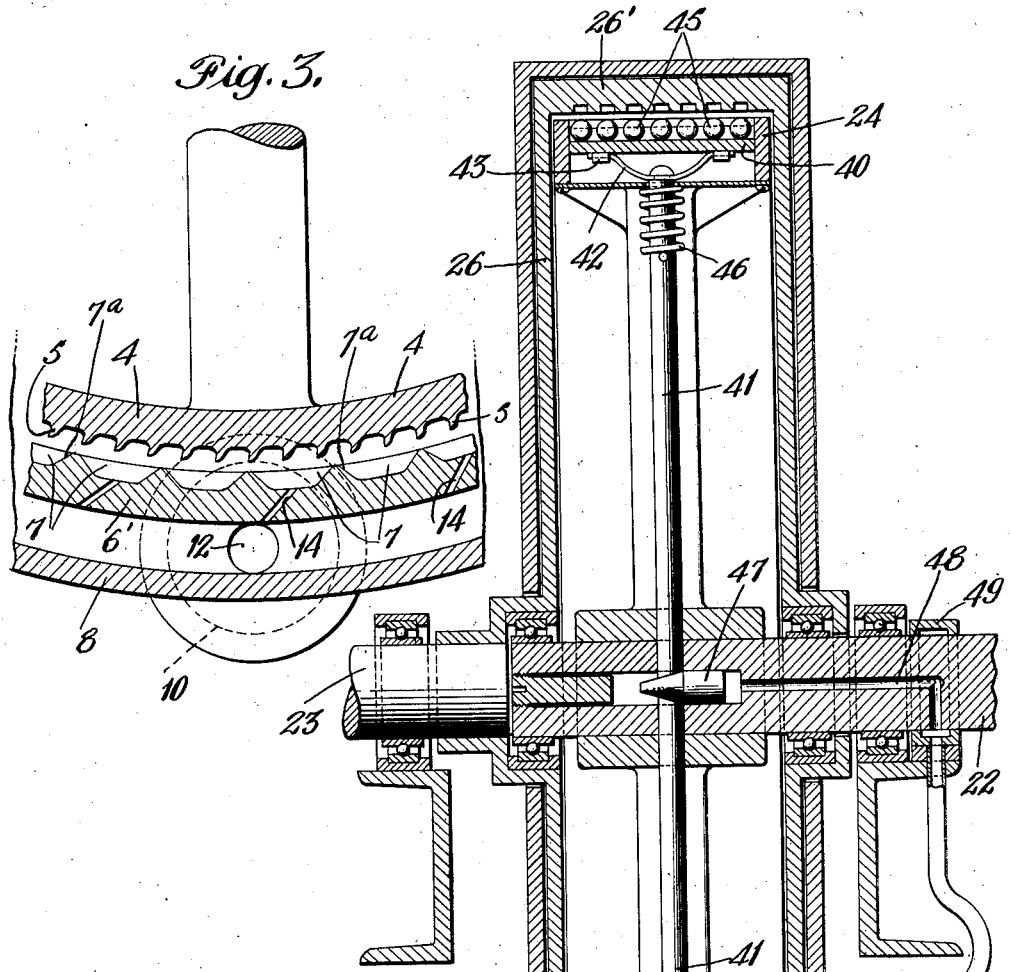

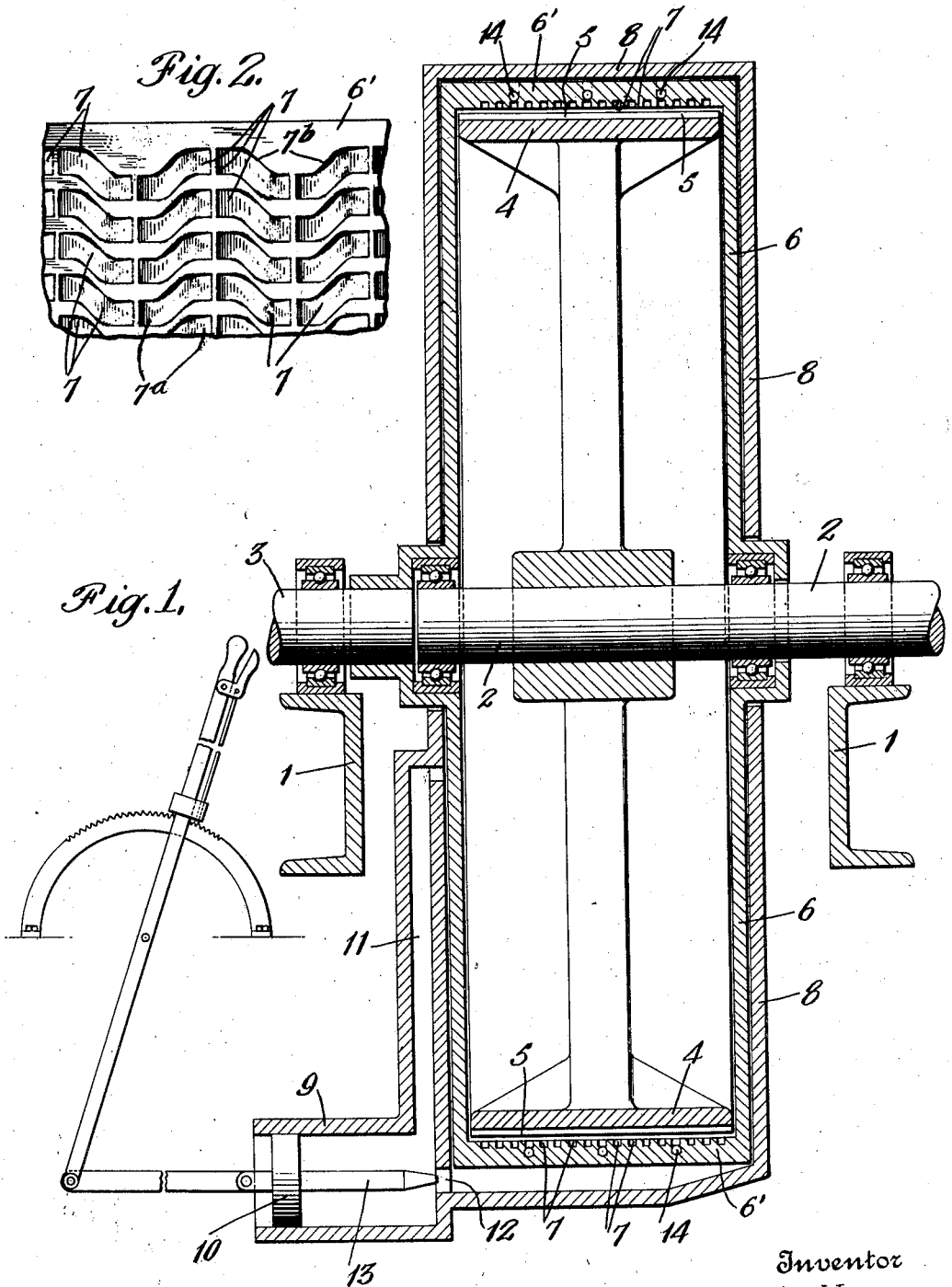

Dec. 20, 1927.

F. A. HOWARD

POWER TRANSMISSION

Filed Oct. 11, 1922     2 Sheets-Sheet 2

1,653,360

Inventor
FRANK A. HOWARD
By His Attorney

Patented Dec. 20, 1927.

1,653,360

UNITED STATES PATENT OFFICE.

FRANK A. HOWARD, OF ELIZABETH, NEW JERSEY, ASSIGNOR TO STANDARD DEVELOPMENT COMPANY, A CORPORATION OF DELAWARE.

POWER TRANSMISSION.

Application filed October 11, 1922. Serial No. 593,786.

My invention relates to the transmission of mechanical power and will be fully understood from the following description.

I propose to transmit power from a driving member, for example a rotating shaft, to a driven member, another shaft, through the intermediary of a body, either a liquid or solid, constrained to move in a definite path but capable of being freely accelerated and decelerated in such movement. This body is alternately accelerated by the driving member and decelerated by the driven member, and thus serves as a conveyor of energy from one to the other, this energy being its kinetic energy or some proportion thereof.

In employing this method and means of power transmission I obtain the advantage of flexibility, and in the case of liquids freedom from mechanical troubles. Thus with a transmission of this character there need be no definite fixed relation between the speeds of the driving and driven members, such ratio being capable of assuming widely varying proportions.

In the accompanying drawings,

Fig. 1 is a cross sectional view of a transmission built in accordance with this invention, Fig. 2 is a developed inside face view of a fragment of the driven member, Fig. 3 is a fragmentary section on the center line of the liquid groove of Fig. 2, showing the relation of the impeller to the driven member, and Fig. 4 is a cross sectional view of a modification.

In these drawings, 1 designates the frame elements which immediately support the transmission, 2 the driving shaft and 3 the driven shaft, each supported in suitable bearings on the frame. On the driving shaft 2 there is fixed an impeller wheel 4, which in cross section is shown in Fig. 3 as being provided on its outer cylindrical face with teeth 5, somewhat similar to ordinary gear teeth but of different cross-section.

The impeller 4 revolves within a drum 6 which is fixed to the driven shaft 3. The active portion of this drum is a cylindrical section 6' which clears the teeth of the impeller by a slight gap. The inner cylindrical face of the drum is provided with grooves 7 (see Figs. 2 and 3). Each groove is of roughly sine-wave form when viewed from the center of the drum, and of the same form in section along its own center line or undulating both laterally and in depth. Specifically each groove consists of a substantially straight section $7^a$ in which the bottom of the groove approaches the surface of the drum, then recedes therefrom, and a curved section $7^b$ in which the groove remains of substantially constant depth but changes the angle of its center line. Successive sections $7^b$ are arranged at equal but opposite angles, thus giving the wave form shown in Fig. 2. The entire face of the cylindrical section of the drum 6' is grooved in this manner.

A stationary housing 8 encloses the drum, and suitable means is provided for supplying a liquid between the impeller and driven member. This may comprise, for example, a receptacle 9 communicating with the housing and having a plunger 10 actuated by suitable link and lever mechanism convenient to the operator, the hand-lever advantageously being of the dog holding type. A duct 11 leads from the receptacle to the housing and serves especially as an inlet, and a port 12 serves chiefly as an outlet from the housing to the receptacle, a stem 13 fixed to the plunger 10 coacting with the port somewhat like a needle valve. Holes 14 about the cylindrical section 6' of the drum and extending through the wall thereof permit passage of the liquid to the space between the drum and impeller.

The operation is as follows:

Assuming the housing to be empty, the liquid all being withdrawn into the receptacle 9, the driving member or impeller 4 on rotation turns freely without imparting any force to the drum 6'. The driving member being rotated at a desired rate, the operator now actuates his control lever to move the plunger 10 and force a quantity of the liquid, for example mercury, into the housing. At first there is a slight torque transmitted to the drum 6' and the liquid is distributed around against the force of gravity. As more liquid is added it comes to be engaged more by the teeth 5 of the impeller and is thrown forward and outward following the receding portions of the grooves. On reaching the curved portions of the grooves it is changed in angle in the plane of the drum face and encountering the ascending portions of the grooves it is additionally changed in angle, and emerges minus the whole or a part of the velocity energy it had initially. Again in the path of the impeller teeth the action is repeated. In this manner the energy of the impeller is absorbed in imparting velocity or an increment of velocity to a free body of liquid, which body in turn imparts this energy or a part thereof to the drum 6' by undergoing change of direction in channels in the drum face out of the direct influence of the impeller.

By regulation of the quantity of liquid within the housing, i. e. by introducing or withdrawing mercury the torque transmitted may be proportionally varied, this of course within the upper limit of the maximum amount of mercury which the grooves and impeller teeth will handle in the prescribed manner. The device is therefore not only a transmission but also a clutching device which permits the driving member to turn independently or to be loaded to any limit within a maximum.

It is of course clear that the principle of operation of this mechanism postulates a certain slip or velocity difference between impeller and drum. For the transmission of any given torque at a given velocity of the impeller teeth this slip is determined by the following:

(1) Mass of liquid acted upon, (which is a function controlled by the operator within the upper limit of the design). (2) Number of cycles of acceleration and deceleration per second, (which is a function of the design controlled by the number of "waves" in the groove per lineal foot). (3) Proportion of total kinetic energy of the moving liquid absorbed in a "cycle" or "wave", (this a function of the curvatures of the grooves, and of the slip).

This transmission is particularly desirable for automotive vehicles driven by variable speed, variable load engines. It is capable of replacing in such vehicles both the ordinary clutch and the gear set, (except for the reverse gear thereof), or it may be used to supplement both or to replace either one, depending upon the characteristic performance expected of the vehicle and engine.

In the modification shown in Fig. 4 there is provided a driving shaft 22 carrying an impeller wheel 24, and a driven shaft 23 carrying a drum 26, the cylindrical section 26' of which has grooves on its inner face undulating both with respect to their floor and laterally. In the rim of the impeller at spaced intervals are openings having a greater length than width, in which are slidable follower members 40 attached to radial rods 41 by bow buffer springs 42, each of the springs being centrally fixed to the rod-end and engaging under shackles 43, on the back of the follower member 40. A straight transverse ball-race 44 contains a number of steel balls 45 corresponding to the number of grooves in the face of the drum, and the radial rods with their attached followers are normally held in retracted position by springs 46 so that the balls do not engage the drum 26. A wedge-cone 47 in a hollow bore of the drive shaft bears against the inner ends of the radial rods and is fashioned as a piston in the bore to be actuated back and forth as desired to expand or release the set of radial rods for action or inaction, a duct 48 communicating with a feed-ring 49 coacting with the shaft and a motive fluid cylinder 50 and piston 51. The piston 51 is actuated by the operator as desired through suitable means, as for example a link and lever mechanism or worm-gear drive.

In the operation of the form of mechanism just described, the driving member is first set in motion at the desired rate, the operator then by means of his control lever or wheel actuates the piston 51 to force the liquid in the duct 48 against the wedge-cone 47 and move the radial rods 41 outwardly, the balls 45 being correspondingly moved outwardly to encounter the drum 26 and follow the grooves thereof. According as the balls are forced more or less fully into engagement in the depths of the grooves, the motion of the impeller is more or less completely transmitted to the driven member 26 and thus the operator can control the rate as desired. When it is desired to stop the driven member, the operator, by means of his hand lever or wheel, draws the piston 51 back, and the wedge-cone 47 retracting and the springs 46 pushing the radial rods 41 and followers 40 inwardly, the balls 45 riding within the confines of the lips of the race as seen, are drawn back from engagement with the grooves in the drum and motion is no longer transmitted.

While in describing my invention, I have referred to certain specific details it will be understood that these are illustrative and not limitative. Nor is the invention to be considered as dependent upon the accuracy of any theoretical views mentioned in connection with explanation of the advantageous results attained, but on the other hand the invention is to be regarded as limited only as defined in the following claims, in which it is my intention to claim all inherent novelty as broadly as the prior art permits.

What I claim is:

1. Apparatus of the character described, comprising a driving shaft, a wheel fixed thereon carrying liquid-engaging abutments on its periphery, a shaft to be driven, a drum fixed thereon and enclosing the said wheel, liquid receiving grooves on the inner face of the drum, said grooves undulating both in depth and laterally, a housing surrounding the drum, a liquid receptacle communicating with the space between the wheel and drum, a plunger in said receptacle and means whereby the plunger may be actuated to control the feed of liquid to the space between the wheel and drum.

2. Apparatus of the character described, comprising a driving shaft, a wheel fixed thereon carrying liquid-engaging abutments on its periphery, a shaft to be driven, a drum fixed thereon and enclosing the said wheel, liquid receiving grooves on the inner face of the drum, said grooves undulating both in depth and laterally, a housing surrounding the drum, and means for introducing and withdrawing liquid in the space between the wheel and drum.

3. Apparatus of the character described, comprising a driving member carrying liquid-engaging abutments, a member to be driven mounted in proximity to the driving member and having liquid-engaging grooves on its surface opposite the driving member, said grooves undulating both in depth and laterally, and means for introducing and withdrawing liquid in the space between the driving member and the driven member.

4. Apparatus of the character described, comprising a driving member, a member to be driven mounted in proximity to the driving member and having grooves on its surface opposite the driving member, said grooves undulating both in depth and laterally, a mobile body introducible to engage between the driving member and the grooves of the driven member to the extent desired, and means for controlling the feed of the mobile body.

5. In combination in a fluid operated transmission mechanism, a driving member adapted to impart motion to a mobile body, and a driven member having grooves for receiving said body, said grooves undulating both in depth and laterally.

FRANK A. HOWARD.